US011536363B2

(12) United States Patent
Anagurthi et al.

(10) Patent No.: US 11,536,363 B2
(45) Date of Patent: Dec. 27, 2022

(54) VEHICLE DRIVELINE COMPONENT HAVING A HOUSING WITH A LUBE FEED RAMP FOR PROVIDING INCREASED LUBRICATION TO A BEARING THAT SUPPORTS A PINION

(71) Applicant: American Axle & Manufacturing, Inc., Detroit, MI (US)

(72) Inventors: Bhanu M. Anagurthi, Oakland Township, MI (US); Robert D. Hopp, Almont, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/490,240

(22) Filed: Sep. 30, 2021

(65) Prior Publication Data

US 2022/0120344 A1 Apr. 21, 2022

Related U.S. Application Data

(60) Provisional application No. 63/094,363, filed on Oct. 21, 2020.

(51) Int. Cl.
*F16H 57/08* (2006.01)
*F16H 57/04* (2010.01)

(52) U.S. Cl.
CPC ......... *F16H 57/082* (2013.01); *F16H 57/043* (2013.01); *F16H 57/0479* (2013.01); *F16H 57/0483* (2013.01); *F16H 2057/085* (2013.01)

(58) Field of Classification Search
CPC .. F16H 57/082; F16H 57/043; F16H 57/0479; F16H 57/0483; F16H 57/0424
See application file for complete search history.

(56) References Cited

U.S. PATENT DOCUMENTS

| 2,019,464 | A | | 3/1935 | Riblet | |
|---|---|---|---|---|---|
| 2,240,118 | A | * | 4/1941 | Matthews | ........... F16C 33/6659 184/11.1 |
| 2,368,963 | A | * | 2/1945 | Boden | ................. F16C 33/6648 184/11.1 |
| 2,618,359 | A | * | 11/1952 | Alden | ....................... F16H 3/64 184/11.1 |
| 2,908,351 | A | * | 10/1959 | Daley, Jr. | ............ F16H 57/0483 184/6.12 |
| 3,383,937 | A | * | 5/1968 | Toenne | ................... F16N 29/02 74/423 |
| 3,792,625 | A | * | 2/1974 | Asberg | .................. F16C 19/548 74/424 |
| 4,227,427 | A | | 10/1980 | Dick | |
| 4,271,717 | A | * | 6/1981 | Millward | ............ F16H 57/0483 74/606 R |

(Continued)

*Primary Examiner* — Derek D Knight
(74) *Attorney, Agent, or Firm* — Burris Law, PLLC

(57) ABSTRACT

A vehicle driveline component having a housing with a lube feed ramp between a bearing bore and a surface in which a first end of a lubricant channel is formed. The bearing supports a pinion for rotation about a first axis. The surface is transverse to the bearing bore. The lube feed ramp is defined by a warped planar surface that provides a transverse transformation between the bearing bore and the surface that is transverse to the bearing bore. The lube feed ramp is configured to direct a portion of a lubricant exiting the bearing into the first end of the lubrication channel.

9 Claims, 8 Drawing Sheets

(56) References Cited

U.S. PATENT DOCUMENTS

| | | | | |
|---|---|---|---|---|
| 8,409,044 B2* | 4/2013 | Hilker | .................... | F16H 48/38 |
| | | | | 475/160 |
| 8,844,396 B2* | 9/2014 | Myers | ................ | F16H 57/0424 |
| | | | | 384/473 |
| 9,022,892 B1 | 5/2015 | Marsh, Jr. et al. | | |
| 2010/0144480 A1* | 6/2010 | Downs | ................ | F16H 57/0483 |
| | | | | 475/160 |
| 2010/0304914 A1* | 12/2010 | Barrett | ................... | F16H 48/08 |
| | | | | 475/160 |

* cited by examiner

VEHICLE DRIVELINE COMPONENT HAVING A HOUSING WITH A LUBE FEED RAMP FOR PROVIDING INCREASED LUBRICATION TO A BEARING THAT SUPPORTS A PINION

CROSS-REFERENCE TO RELATED APPLICATIONS

This application claims the benefit of U.S. Provisional Application No. 63/094,363 filed Oct. 21, 2020, the disclosure of which is incorporated by reference as if fully set forth in detail herein.

FIELD

The present disclosure relates to a vehicle driveline component having a housing with a lube feed ramp for providing increased lubrication to a bearing that supports a pinion.

BACKGROUND

This section provides background information related to the present disclosure which is not necessarily prior art.

Vehicle driveline components, including power take-off units and axle assemblies, commonly employ a hypoid gear arrangement in which a rotational axis of a pinion is vertically offset from a rotational axis of a ring gear. The pinion is typically supported by one or more bearings that are configured to handle both radial loads and axial or thrust loads. The ring gear typically rotates through a sump containing a liquid lubricant. Lubricant that clings to the surface of the ring gear as the ring gear rotates through the sump is slung from the ring gear against the interior walls of the housing when the ring gear is rotated in a predetermined rotational direction above a predetermined rotational speed. A channel can be formed in the housing of the vehicle driveline component that can direct the slung lubricant to the bearing as the slung lubricant drains from the interior walls of the housing. When the ring gear is rotated at relatively low rotational speeds, however, the amount of lubricant that is slung from the ring gear may not be sufficient to provide the bearing with a desired flow of lubricant.

SUMMARY

This section provides a general summary of the disclosure, and is not a comprehensive disclosure of its full scope or all of its features.

A vehicle driveline component having a housing, a pinion, a ring gear and a bearing. The housing defines a pinion bore, a bearing bore, a central chamber, and a lubrication channel. The pinion bore is disposed about a first axis. The bearing bore is concentric with the pinion bore and intersects the central chamber. The central chamber is formed along a second axis that is transverse to the first axis. The lubrication channel has a first side, which intersects the central chamber, and a second side opposite the first side that intersects the pinion bore. At least a portion of the first side of the lubrication channel is formed into a surface that is transverse to the bearing bore. The pinion is received in the housing and is rotatable about the first axis. The pinon has a pinion gear and a pinion shaft. The ring gear is received in the housing. The ring gear is rotatable about the second axis and is meshed with the pinion gear. The bearing is received in the bearing bore and is mounted to both the pinion shaft and the housing. The bearing supports the pinon relative to the housing for rotation about the first axis. The bearing is disposed proximate an end of the pinion gear that faces away from the ring gear. The housing defines a lube feed ramp that extends between the pinion bore and the first side of the lubrication channel. The lube feed ramp is defined by a warped planar surface that provides a transverse transformation between the bearing bore and the surface that is transverse to the bearing bore. The lube feed ramp is configured to direct a portion of a lubricant exiting the bearing into the first end of the lubrication channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
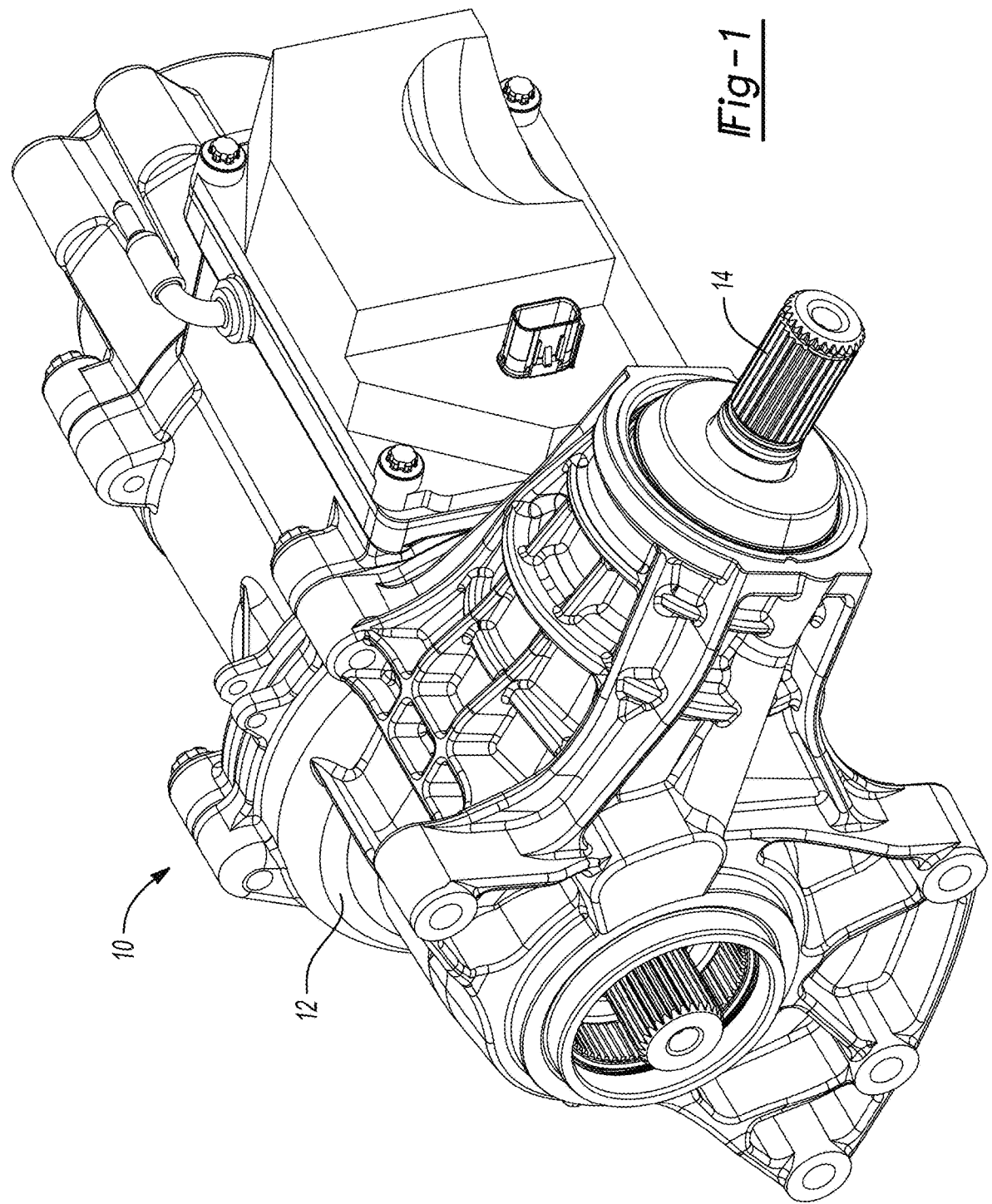
FIG. 1 is a perspective view of an exemplary vehicle driveline component constructed in accordance with the teachings of the present disclosure.
Figure 2:
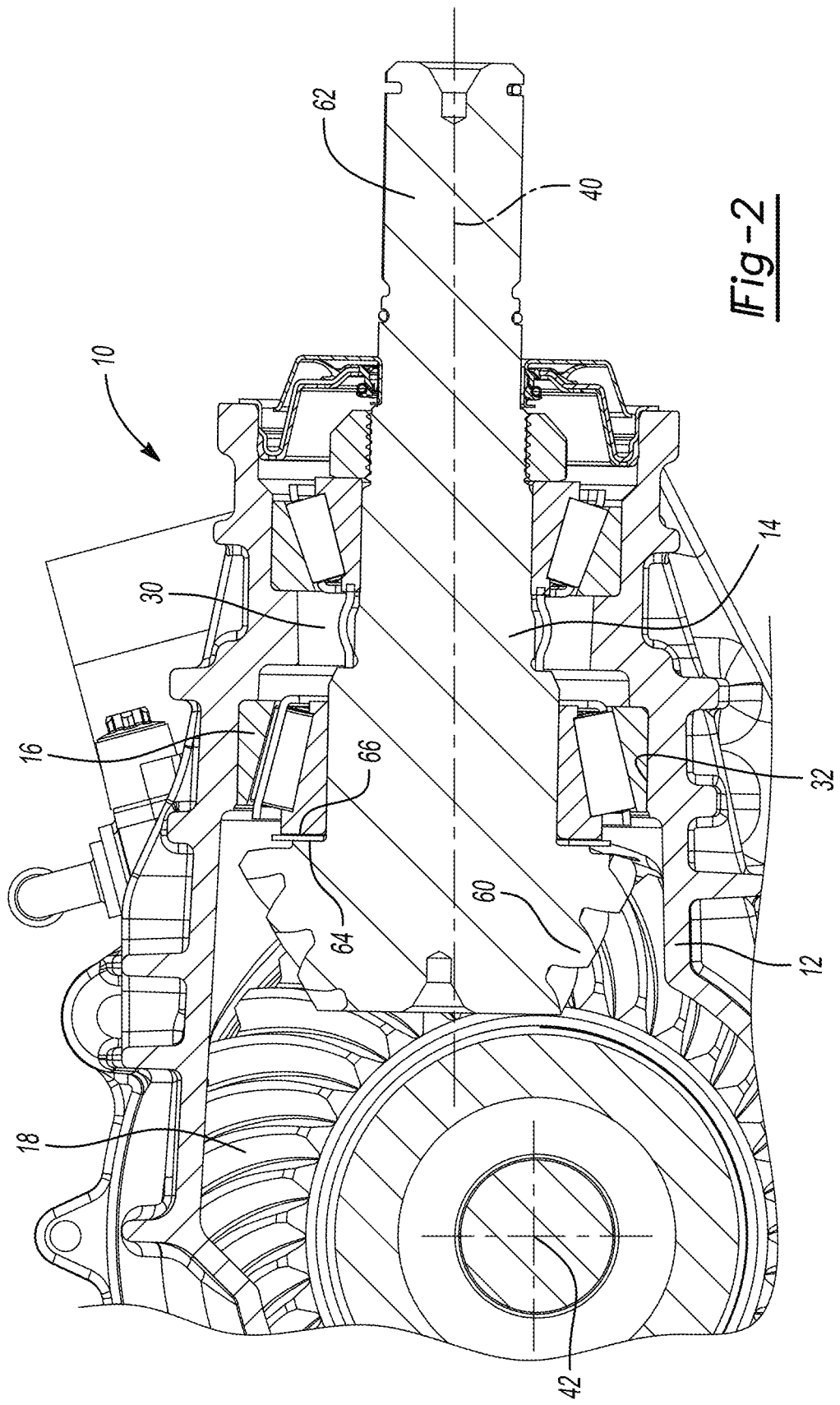
FIG. 2 is a section view of a portion of the vehicle driveline component of FIG. 1 taken along a rotational axis of a pinion.
Figure 3:
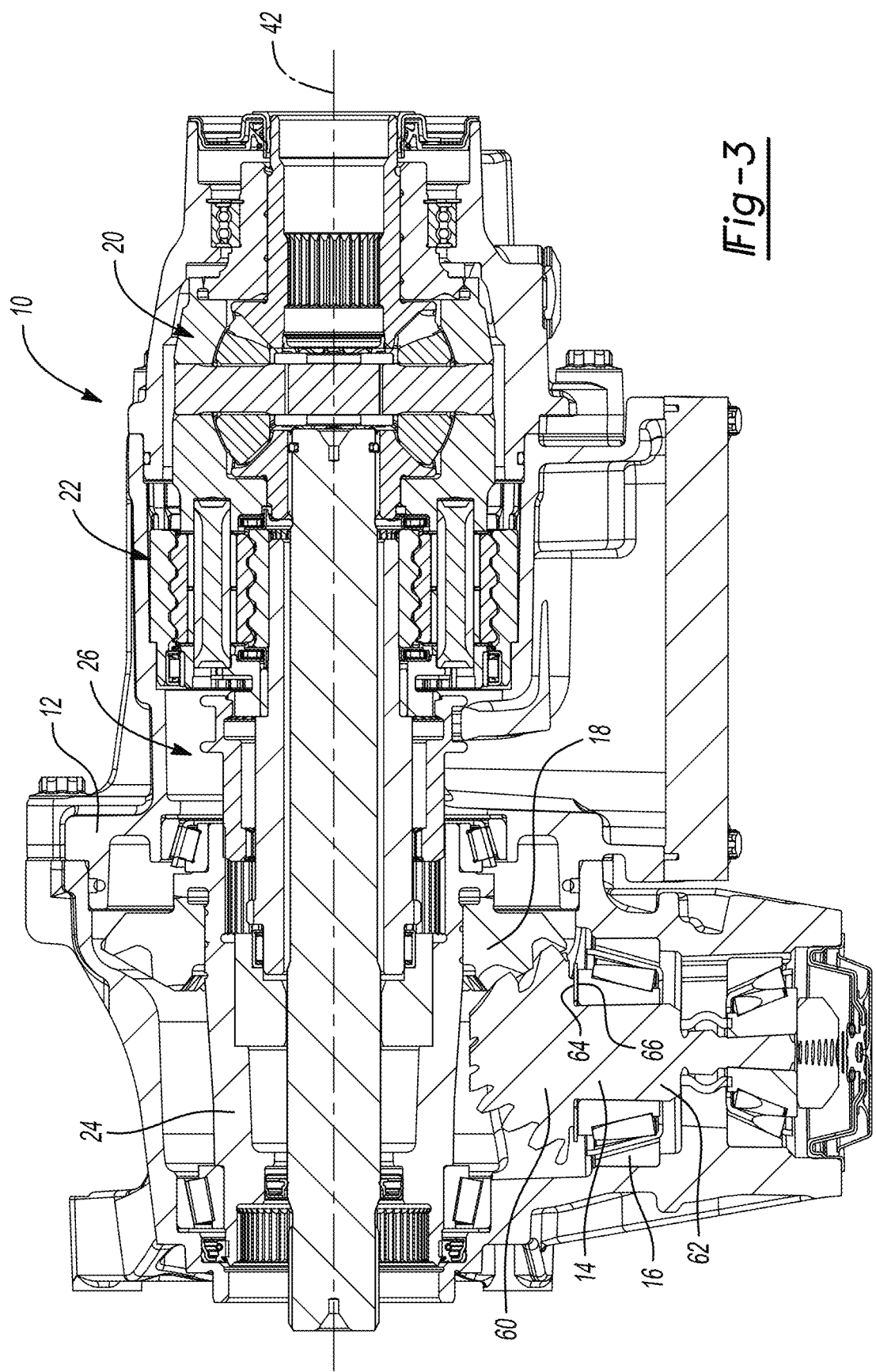
FIG. 3 is a section view of a portion of the vehicle driveline component of FIG. 1 taken along a rotational axis of a ring gear.

With reference to FIGS. 1 through 3, an exemplary vehicle driveline component constructed in accordance with the teachings of the present disclosure is generally indicated by reference numeral 10. The vehicle driveline component depicted in this example is a differential and power take-off unit that is configured to distribute rotary power to drive a primary set of vehicle wheels (via the differential) and to transmit rotary power that is used to drive a secondary set of vehicle wheels (via the power take-off unit). It will be appreciated that the teachings of the present disclosure have application to various other types of vehicle driveline components, including front and rear axles and to electric drive units.

The vehicle driveline component 10 can include a housing 12, a pinion 14, a bearing 16 and a ring gear 18. In the particular example provided and as best shown in FIG. 3, the vehicle driveline component 10 further includes a differential 20, a transmission 22, a spindle 24 and a coupling 26.

Figure 4:
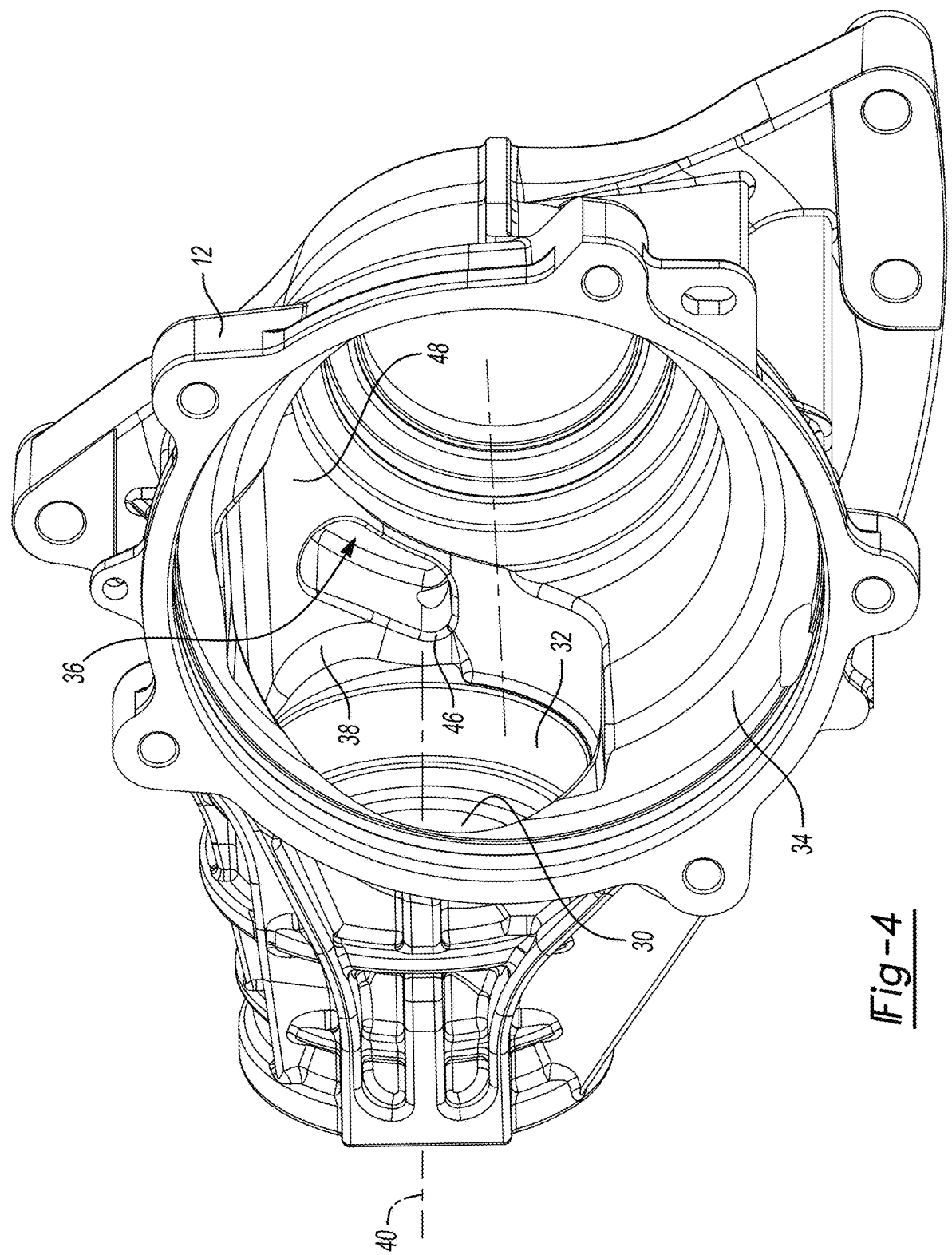
FIG. 4 is a perspective view of a portion of the vehicle driveline component of FIG. 1 illustrating the housing in more detail.
Figure 5:
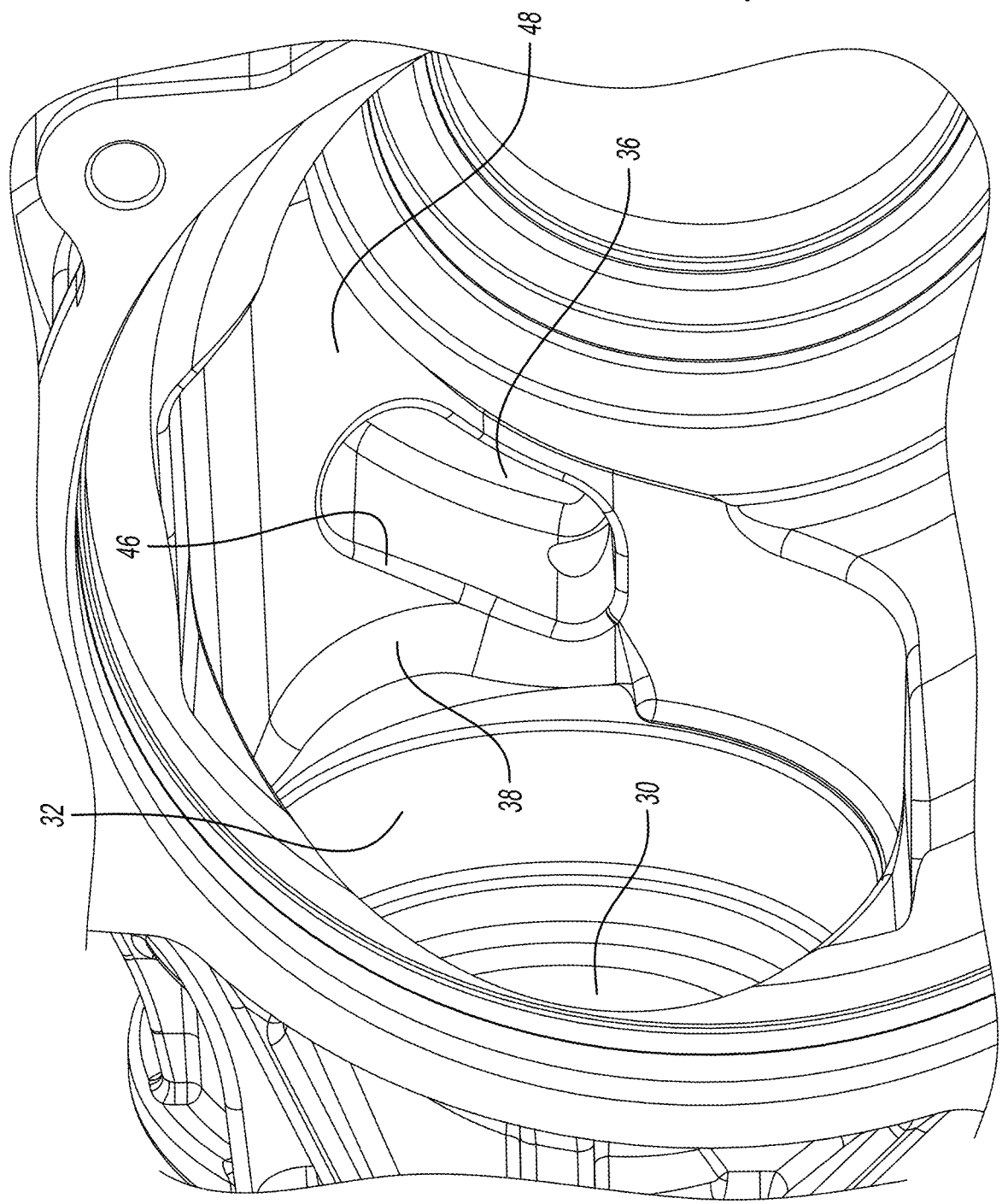
FIG. 5 is an enlarged portion of FIG. 4 illustrating a bearing bore, a first side of a lubrication channel, and a lube feed ramp in more detail.
Figure 6:
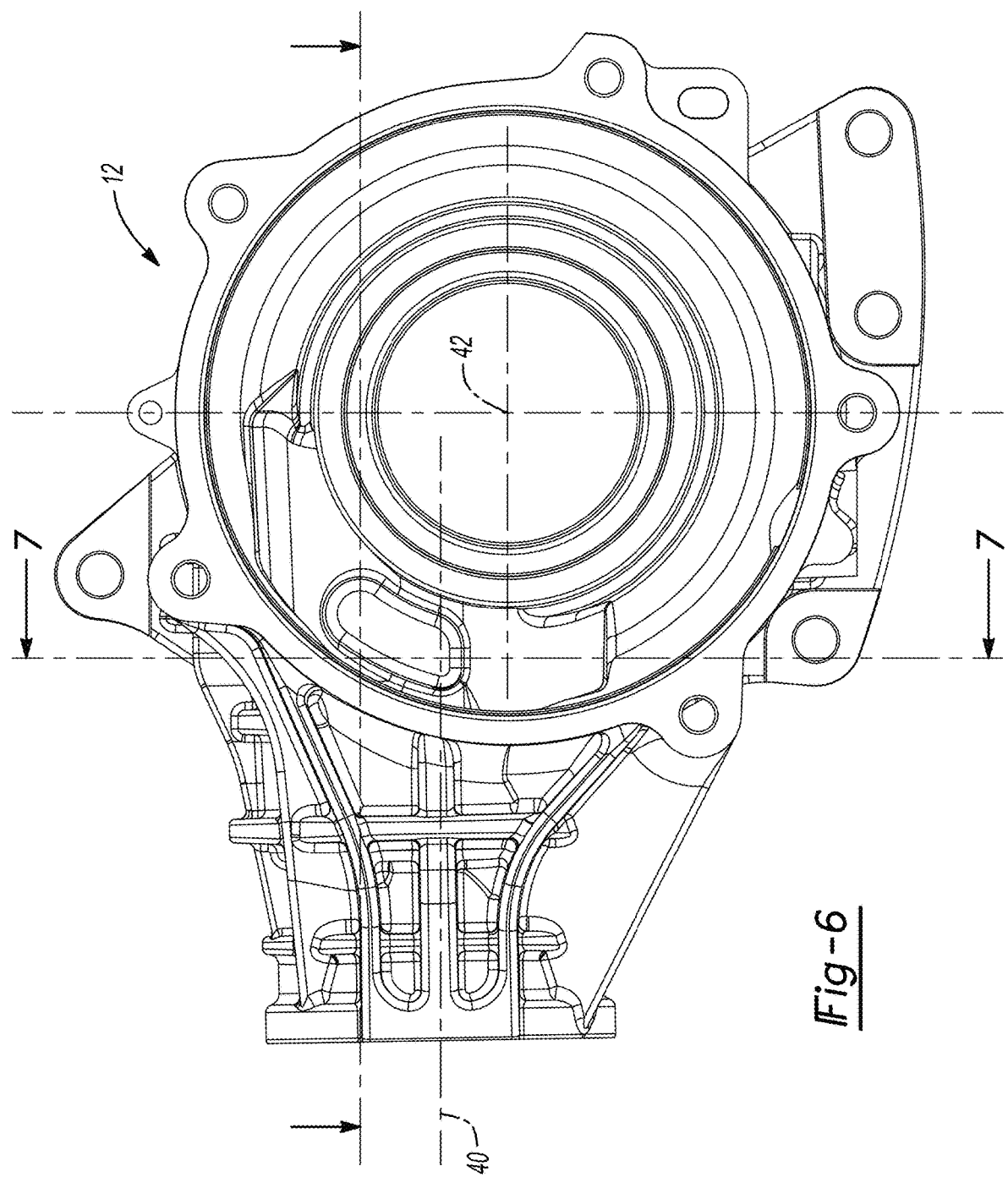
FIG. 6 is a side elevation view of the housing.
Figure 7:
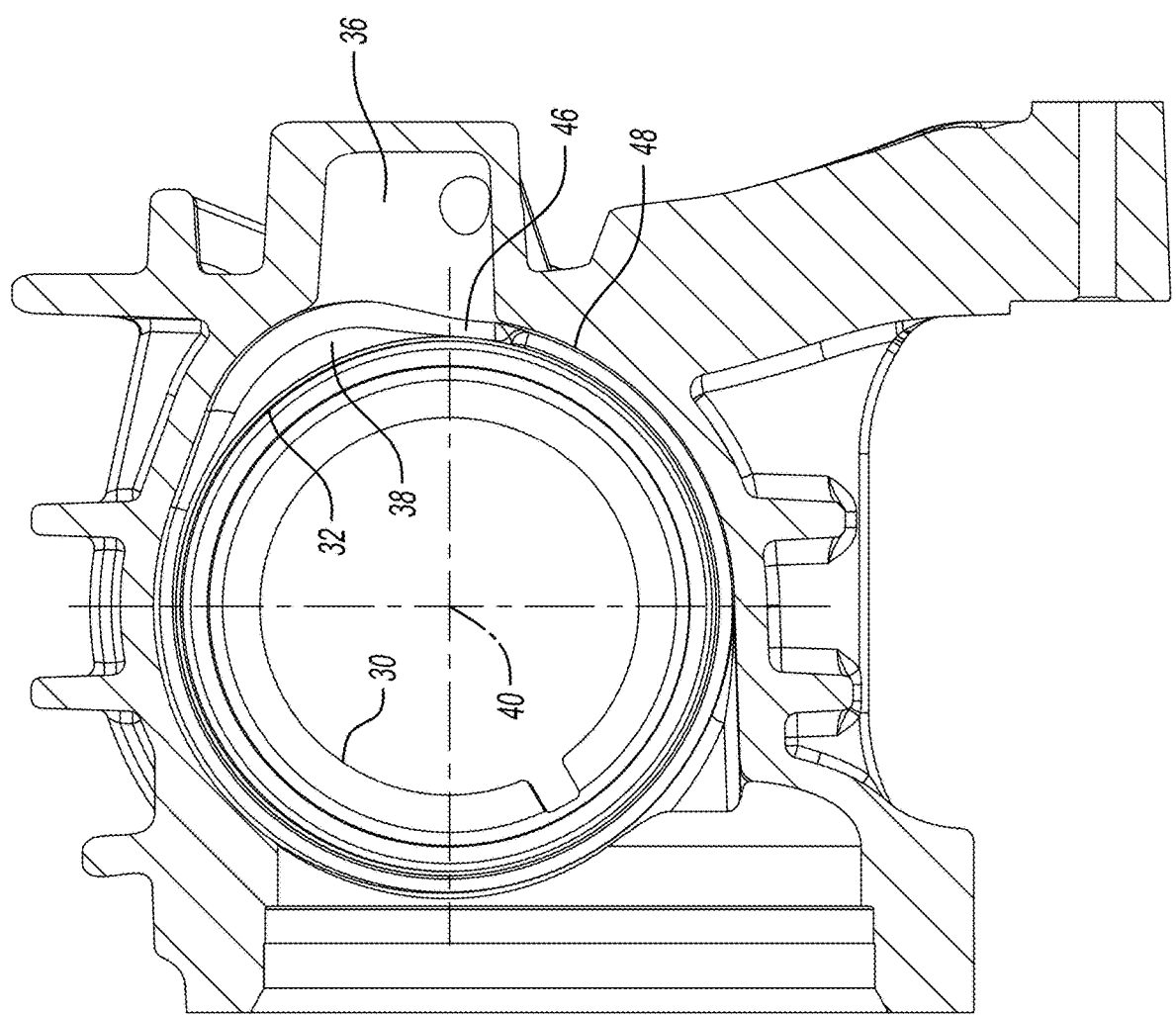
FIG. 7 is a section view taken along the line 7-7 of FIG. 6.

With reference to FIGS. 2 and 4, the housing 12 can be an integrally and unitarily formed structure, or can be formed of two or more housing components that are assembled to one another. The housing 12 defines a pinion bore 30, a bearing bore 32, a central chamber 34, a lubrication channel 36, and a lube feed ramp 38. The pinion bore 30 is disposed concentrically about a first axis 40. The bearing bore 32 is concentric with the pinion bore 30 and intersects the central chamber 34. The central chamber 34 is formed along a second axis 42 that is transverse to the first axis 40.

With reference to FIGS. 4 through 7, the lubrication channel 36 has a first end or side 46, which intersects the central chamber 34, and a second end or side (not specifically shown) that intersects the pinion bore 30. At least a portion of the first side 46 of the lubrication channel 36 is formed into a surface 48 that is transverse to the bearing bore 32. Stated another way, at least a portion of the housing 12 in which the first side 46 of the lubrication channel 36 is formed through is transverse to and spaced apart from the bearing bore 32. The lube feed ramp 38 extends between the pinion bore 30 and the first side 46 of the lubrication channel 36. The lube feed ramp 38 is defined by a warped planar surface that provides a transverse transformation between the bearing bore 32 and the surface 48 of the housing 12 that is transverse to the bearing bore 32.

Returning to FIGS. 2 and 3, the pinion 14 has a pinion gear 60 and a pinion shaft 62 that extends from the pinion gear 60. The pinion gear 60 can be a type of spiral bevel gear, such as a hypoid gear. The pinion 14 is received in the housing 12 and is rotatable about the first axis 40. More specifically, the pinion shaft 62 is received through the bearing bore 32 and extends into the pinion bore 30, while the pinion gear 60 is disposed in the central chamber 34.

The ring gear 18 is received in the central chamber 34 of the housing 12. The ring gear 18 is meshed with the pinion gear 60 and is rotatable about the second axis 42.

The bearing 16 is received in the bearing bore 32 and is mounted to both the pinion shaft 62 and the housing 12. The bearing 16 is configured to support the pinion 14 relative to the housing 12 for rotation about the first axis 40. The bearing 16 can also be configured to support a load or force that is directed along the first axis 40 from the pinion 14 to the housing 12. It will be appreciated that during meshing engagement between the ring gear 18 and the pinion gear 60 that a thrust load along the first axis 40 will be generated when the pinion gear 60 is rotated in a predetermined rotational direction about the first axis 40. Accordingly, the bearing 16 can be an angular contact bearing, a four-point angular contact bearing or a tapered roller bearing. The bearing 16 is disposed along the first axis 40 at a location where the bearing 16 is proximate an end 64 of the pinion gear 60 that faces away from the ring gear 18. In this regard, the bearing 16 may directly abut the end 64 of the pinion gear 60, or a thrust washer 66 could be disposed along the first axis 40 between the end 64 of the pinion gear 60 and the bearing 16.

While the vehicle driveline component 10 has been described as including a bearing (i.e. bearing 16) for rotationally and axially supporting the pinion 14 relative to the housing 12, it will be appreciated that one or more additional bearings could be employed to support the pinion 14 relative to the housing 12, for example when the pinion gear 60 is rotated in a rotational direction about the first axis 40 that is opposite the predetermined direction.

Figure 8:
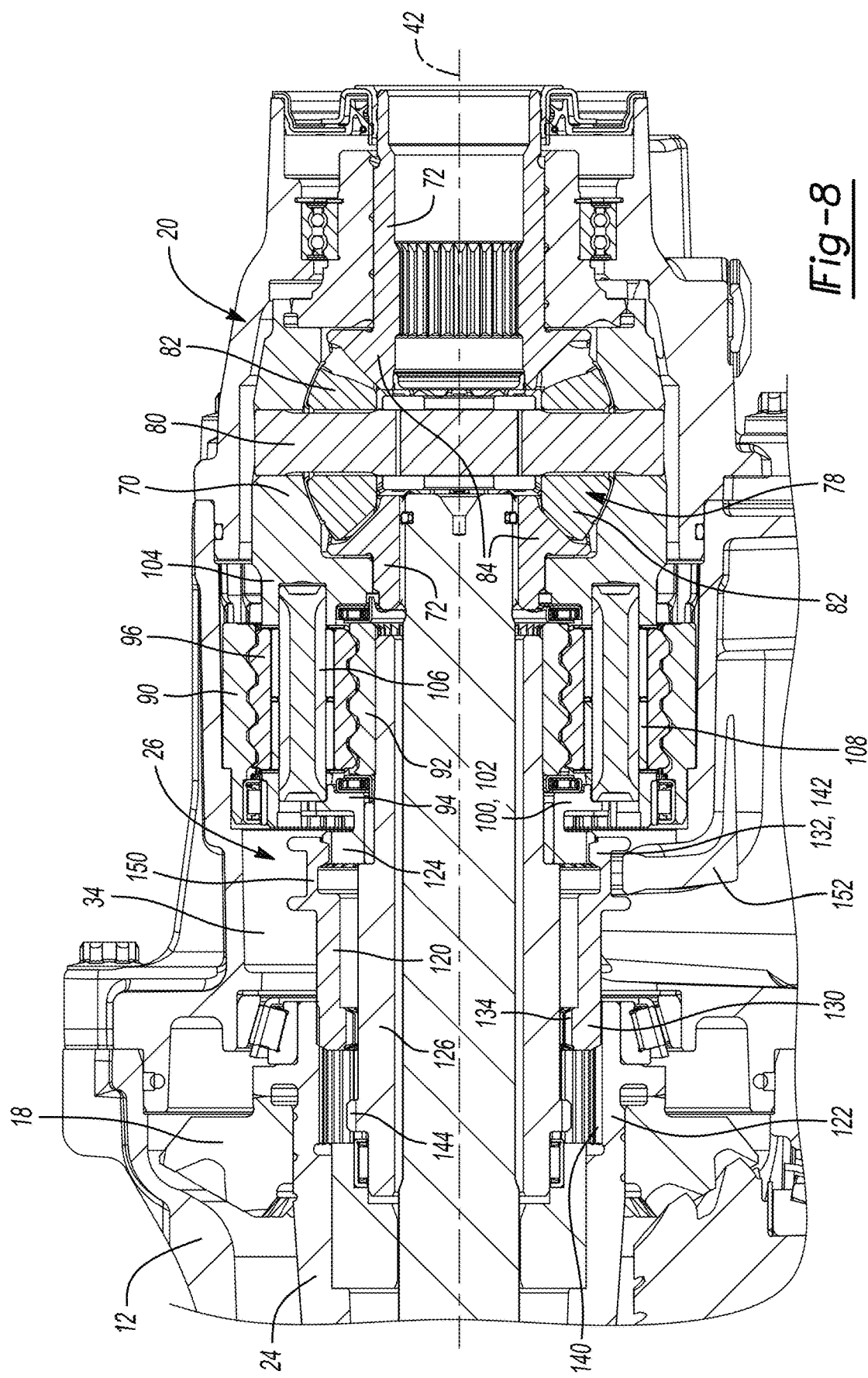
FIG. 8 is an enlarged portion of FIG. 3.

With reference to FIG. 8, the differential 20 can be received in the central chamber 34 of the housing 12 and can be rotatable about the second axis 42 relative to the housing 12. The differential 20 can include a differential input 70 and a pair of differential outputs 72. In the example provided, the differential input 70 is a differential case, the differential 20 includes a differential gearset 78 having a cross-pin 80, which is mounted to the differential case in an orientation that is perpendicular to the second axis 42, a pair of differential pinions 82, which are received on and rotatable relative to the cross-pin 80, and a pair of side gears 84, which are meshingly engaged with the differential pinions 82, and the differential outputs 72 are unitarily and integrally formed with the side gears 84. The differential 20 shown in this example is a conventional open differential, but it will be appreciated that other types of differentials, such as a limited slip differential, an electronic limited slip differential, or a locking differential could be substituted for the open differential that is employed in this particular example.

The spindle 24 is received in the housing 12 and is rotatable about the second axis 42. The spindle 24 is disposed in a drive path between the differential input 70 and the ring gear 18 where it would be possible to rotate the ring gear 18 through rotation of the differential input 70. In the particular example provided, the spindle 24 and the ring gear 18 are directly coupled to one another for common rotation.

The transmission 22, which is optional, can also be disposed in the drive path between the differential input 70 and the ring gear 18. In the example provided, the spindle 24 is the rotary input of the vehicle driveline component 10. It will be appreciated, however, that rotary power could be input to the vehicle driveline component 10 directly to the differential input 70. The transmission 22 can be any type of transmission, such as a planetary transmission, and can provide two or more speed (i.e., gear reduction) ratios. In the example provided, the transmission 22 is a single-stage, two-speed transmission, having an annular gear 90, a hollow sun gear 92, a planet carrier 94 and a plurality of planet gears 96. The annular gear 90, the sun gear—and the planet gears 96 are formed with helical teeth in this example. The annular gear 90 is received in the central chamber 34 concentrically about the second axis 42 and is non-rotatably coupled to the housing 12. The hollow sun gear 92 is rotatable about the second axis 42 and is concentric with the annular gear 90. The planet carrier 94 includes a carrier body 100, which includes a carrier plate 102 and a carrier structure 104, and a plurality of pins 106 that are fixedly coupled to carrier body 100. The carrier plate 102 can have an annular configuration, while the carrier structure 104 can be integrally and unitarily formed with the differential input 70. The pins 106 are disposed parallel to the second axis 42 but are spaced circumferentially about the second axis 42. A first end of each of the pins 106 is fixedly coupled to the carrier plate 102, while a second, opposite end of each of the pins 106 is fixedly coupled to the differential input 70. Each of the planet gears 96 can be rotatably received on an associated one of the pins 106 and can be meshingly engaged with the annular gear 90 and the hollow sun gear 92. If desired, one or more bearings, such as needle bearings 108, can be disposed between the pins 106 and the planet gears 96.

The coupling 26 can be configured to selectively rotary power between the differential input 70 and the ring gear 18 and can also be configured to change the gear ratio in which the transmission 22 operates. In the example provided, the coupling 26 comprises a sleeve 120, a first coupling member 122, a second coupling member 124, and a third coupling member 126. The sleeve 120 has a set of first external teeth 130, which are disposed on a first axial end of the sleeve 120, a set of first internal teeth 132, which can be disposed on a second axial end of the sleeve 120 that is opposite the first end, and a set of second internal teeth 134 that can be disposed on the first axial end of the sleeve 120. The first coupling member 122 comprises a set of third internal teeth 140 that are coupled to the spindle 24 for rotation therewith. In the example provided, the third internal teeth 140 of the first coupling member 122 are unitarily and integrally formed with the spindle 24. The second coupling member 124 can be coupled to the carrier body 100 for rotation therewith. In the example provided, the second coupling member 124 comprises a set of second external teeth 142 that are unitarily and integrally formed with the carrier plate 102. The third coupling member 126 can be a tubular component that can be coupled to the hollow sun gear 92 for common rotation about the second axis 42. The third coupling member 126 can have a set of third external teeth 144. The first external teeth 130 on the sleeve 120 are engaged to the third internal teeth 140 on the spindle 24 so that the sleeve 120 is rotatably coupled to the spindle 24 while being movable along the second axis 42 relative to the spindle 24 between a first sleeve position, a second sleeve position and a third sleeve position.

When the sleeve 120 is positioned in the first sleeve position, the first internal teeth 132 on the sleeve 120 are engaged with the second external teeth 142 on the second coupling member 124 to thereby rotatably couple the spindle 24 to the planet carrier 94. Accordingly, rotary power input to the vehicle driveline component 10 via the spindle 24 is transmitted though the sleeve 120 to the planet carrier 94, causing the transmission 22 to operate in a first speed ratio. Since the carrier structure 104 of the planet carrier 94 is fixedly coupled to the differential input 70, the transmission 22 operates in a 1:1 speed ratio when the sleeve 120 is in the first position.

When the sleeve 120 is positioned in the second sleeve position, the second internal teeth 134 on the sleeve 120 are engaged with the third external teeth 144 on the third coupling member 126 to thereby rotatably couple the spindle 24 to the hollow sun gear 92. Accordingly, rotary power input to the vehicle driveline component 10 via the spindle 24 is transmitted to the hollow sun gear 92 to cause the transmission to operate in a second speed ratio where the planet carrier 94 and the differential input 70 are driven at a rotational speed that is lower than the rotational speed of the spindle 24.

When the sleeve 120 is positioned in the third position, which is disposed between the first and second positions in the example provided, the first internal teeth 132 and the second internal teeth 134 on the sleeve 120 are disengaged from the second external teeth 142 and the third external teeth 144. As such, the sleeve 120 does not transmit rotary power between the spindle 24 and the planet carrier 94 or between the spindle 24 and the hollow sun gear 92.

It will be appreciated that any desired actuator can be employed to selectively move the sleeve 120 along the second axis 42 between the several sleeve positions. In the example provided, the sleeve 120 has a conventional annular fork mount 150 that is configured to receive a shift or clutch fork 152 therein. The annular fork mount 150 and the clutch fork 152 are configured so that the sleeve 120 can rotate relative to the clutch fork 152, and so that axial movement of the clutch fork 152 causes associated movement of the sleeve 120 along the second axis 42.

With reference to FIGS. 2, 4, 5 and 7, during operation of the vehicle driveline component 10, it is necessary to provide the bearing 16 with lubrication. The ring gear 18 will rotate through a lubricant that is disposed in a sump that is formed by the housing 12. A portion of the lubricant in the sump will cling to surface of the ring gear 18 as the ring gear 18 rotates through the sump. Centrifugal force acting on the lubricant that clings to the surface of the ring gear 18 will cause a portion of the clinging lubricant to be slung from the ring gear 18 against the interior surfaces of the housing 12 that are disposed about the ring gear 18. These surfaces can be contoured such that a portion of the slung lubricant drains into the first side 46 of the lubrication channel 36. The lubrication channel 36 can be filled in this way to a point where the lubricant can flow into the bearing 16. Due to centrifugal force, the bearing 16 acts as a sort of pump that creates a flow of lubricant through the bearing 16 that exits the bearing 16 and flow toward an end 64 of the pinion gear 60 that faces away from the ring gear 18. The end 64 of the pinion gear 60 (or a thrust washer mounted on the pinion shaft 62 and which is disposed against the end 64 of the pinion gear 60) blocks the flow of the lubricant exiting the bearing 16 along the first axis 40, which causes the flow to move radially outwardly from the bearing 16 in roughly a plane that is perpendicular to the first axis 40. The lube feed ramp 38 is configured to direct a portion of the radially outward flow of the lubricant into the first end 64 of the lubrication channel 36. The lube feed ramp 38 is defined by a warped planar surface (on the interior of the housing 12) that provides a transverse transformation between the bearing bore 32 and the surface 48 that is transverse to the bearing bore 32. In the particular example provided, the lube feed ramp 38 intersects an approximately 90-degree sector of the bearing bore 32 and is positioned at a location where gravity would aid the movement of lubricant over the lube feed ramp 38 and into the first end 64 of the lubrication channel 36. Accordingly, it will be appreciated that the lube feed ramp 38 is a warped planar surface that smoothly bends between the bearing bore 32 and the first end 64 of the lubrication channel 36 in a manner that facilitates a flow of lubricant over at least a portion of the lube feed ramp 38 and into the first end 64 of the lubrication channel 36.

While the lube feed ramp 38 is effective in directing lubricant that exits the bearing 16 into the first end 64 of the lubrication channel 36 at all rotational speeds of the pinion 14 that are within a predetermined range of rotational speeds, the lube feed ramp 38 is particularly helpful to ensure that sufficient lubricant flows into the first end 64 of the lubrication channel 36 at relatively low speeds in the predetermined range of rotational speeds where the amount of lubricant that is slung from the ring gear 18 may otherwise provide less lubricant to the first end 64 of the lubrication channel 36 than would be desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
a housing defining a pinion bore, a bearing bore, a central chamber, and a lubrication channel, the pinion bore being disposed about a first axis, the bearing bore being concentric with the pinion bore and intersecting the central chamber, the central chamber being formed along a second axis that is transverse to the first axis, the lubrication channel having a first side, which intersects the central chamber, and a second side opposite the first side that intersects the pinion bore, wherein at least a portion of the first side of the lubrication channel is formed into a surface that is transverse to the bearing bore;

a pinion received in the housing and rotatable about the first axis, the pinon having a pinion gear and a pinion shaft;

a ring gear received in the housing, the ring gear being rotatable about the second axis and being meshed with the pinion gear; and a bearing received in the bearing bore and mounted to both the pinion shaft and the housing, the bearing supporting the pinon relative to the housing for rotation about the first axis, the bearing being disposed proximate an end of the pinion gear that faces away from the ring gear;

wherein the housing defines a lube feed ramp that extends between the pinion bore and the first side of the lubrication channel, the lube feed ramp being defined by a warped planar surface that provides a transverse transformation between the bearing bore and the surface that is transverse to the bearing bore, the lube feed ramp being configured to direct a portion of a lubricant exiting the bearing into the first side of the lubrication channel.

2. The vehicle driveline component of claim 1, further comprising a differential having a differential input and a pair of differential outputs, the differential input being disposed in a drive path with the ring gear.

3. The vehicle driveline component of claim 2, further comprising a coupling between the differential input and the ring gear, the coupling being operable in a first mode, which permits torque transmission along the drive path between the differential input and the ring gear, and a second mode that inhibits torque transmission along the drive path between the differential input and the ring gear.

4. The vehicle driveline component of claim 3, further comprising a two-speed transmission in the drive path between the differential input and the ring gear.

5. The vehicle driveline component of claim 4, wherein the coupling comprises a sleeve that is movable along the second axis, the sleeve being movable between a first position, in which the coupling operates in the first mode and the two-speed transmission provides a first speed reduction ratio, a second position, in which the coupling operates in the second mode, and a third position in which the coupling operates in the first mode and the two-speed transmission provides a second speed reduction ratio.

6. The vehicle driveline component of claim 5, wherein the ring gear is mounted on a spindle, wherein an internal diameter of the spindle is formed with first teeth and wherein the sleeve has second teeth that engage the first teeth when the sleeve is disposed in each of the first, second and third positions.

7. The vehicle driveline component of claim 5, wherein the two-speed transmission is a planetary transmission and wherein the sleeve rotatably couples a sun gear of the planetary transmission to the spindle when the sleeve is in one of the first and third positions.

8. The vehicle driveline component of claim 7, wherein the sleeve rotatably couples a planet carrier of the planetary transmission to the spindle when the sleeve is in the other one of the first and third positions.

9. The vehicle driveline component of claim 1, wherein the first side of the lubrication channel is completely formed into the surface that is transverse to the bearing bore.

* * * * *